United States Patent
Lin et al.

(10) Patent No.: US 10,495,847 B2
(45) Date of Patent: Dec. 3, 2019

(54) ZOOM LENS

(71) Applicant: Young Optics Inc., Hsinchu (TW)

(72) Inventors: Ying-Hsiu Lin, Hsinchu (TW);
Yu-Hung Chou, Hsinchu (TW);
Bing-Ju Chiang, Hsinchu (TW)

(73) Assignee: YOUNG OPTICS INC., Hsinchu (TW)

( * ) Notice: Subject to any disclaimer, the term of this patent is extended or adjusted under 35 U.S.C. 154(b) by 0 days.

(21) Appl. No.: 15/709,845

(22) Filed: Sep. 20, 2017

(65) Prior Publication Data
US 2019/0086635 A1   Mar. 21, 2019

(51) Int. Cl.
*G02B 9/34* (2006.01)
*G02B 13/18* (2006.01)
*G02B 15/14* (2006.01)
*H04N 5/232* (2006.01)

(52) U.S. Cl.
CPC ............ *G02B 9/34* (2013.01); *G02B 13/18* (2013.01); *G02B 15/14* (2013.01); *H04N 5/23238* (2013.01)

(58) Field of Classification Search
CPC ........ G02B 13/004; G02B 9/34; G02B 13/18; G02B 13/04; G02B 27/0025; G02B 5/005; G02B 13/0015; G02B 13/06; G02B 5/208; G02B 9/58; G02B 13/0045; G02B 13/02; G02B 7/021; G02B 9/60; G02B 13/001; G02B 1/041; G02B 13/009; G02B 3/00; G02B 3/04; G02B 13/00

See application file for complete search history.

(56) References Cited

U.S. PATENT DOCUMENTS

| | | |
|---|---|---|
| 5,583,697 A | 12/1996 | Mukaiya |
| 5,712,733 A | 1/1998 | Mukaiya |
| 6,542,312 B1 | 4/2003 | Okayama et al. |
| 6,587,281 B2 | 7/2003 | Hozumi et al. |
| 6,788,474 B2 | 9/2004 | Hozumi et al. |
| 2008/0291546 A1* | 11/2008 | Kusaka ........... G02B 15/173 359/687 |
| 2012/0105693 A1* | 5/2012 | Hagiwara ........ G02B 15/173 348/294 |
| 2012/0113516 A1* | 5/2012 | Kimura ............ G02B 15/173 359/557 |
| 2014/0240554 A1* | 8/2014 | Uchida ............. G02B 15/22 348/240.99 |
| 2015/0029596 A1* | 1/2015 | Cai ................. G02B 15/173 359/687 |
| 2016/0349531 A1* | 12/2016 | Kawamura ....... G02B 27/646 |

* cited by examiner

*Primary Examiner* — William R Alexander
*Assistant Examiner* — Sharrief I Broome
(74) *Attorney, Agent, or Firm* — Wpat, PC

(57) ABSTRACT

A zoom lens includes a first lens group, a second lens group, a third lens group, a fourth lens group and an aperture. The first lens group, the second lens group, the third lens group and the fourth lens group are sequentially arranged in a direction. The aperture is located between the second lens group and the third lens group. When the zoom lens performs a zoom operation, the first lens group and the third lens group are fixed and the second lens group and the fourth lens group are moved, and a moving distance of the fourth lens group on an optical axis of the zoom lens is less than 5 mm.

20 Claims, 13 Drawing Sheets

US 10,495,847 B2

ZOOM LENS

TECHNICAL FIELD

The present invention relates to an optical lens, and more particularly to a zoom lens.

BACKGROUND

With the advancement of modern video technology, video devices such as projectors, digital recorders and digital cameras have been widely used and applied in various fields. The lens is referred to as one of the essential elements in the video device for determining the image quality. Therefore, how to manufacture a zoom lens with small size, high performance, low aberration, wide viewing angle, cheap, high resolution and 24-hours confocal image-capturing capability is one of the important topics of the persons in the field.

SUMMARY

Other objectives and advantages of the present invention may be further understood from the technical features disclosed in the embodiments of the present invention.

An embodiment of the present invention provides a zoom lens, which includes a first lens group, a second lens group, a third lens group, a fourth lens group and an aperture. The first lens group, the second lens group, the third lens group and the fourth lens group are sequentially arranged in a direction. The aperture is located between the second lens group and the third lens group. When the zoom lens performs a zoom operation, the first lens group and the third lens group are fixed and the second lens group and the fourth lens group are moved, and a moving distance of the fourth lens group on an optical axis of the zoom lens is less than 5 mm.

An embodiment of the present invention provides a zoom lens, which includes a first lens group, a second lens group, a third lens group, a fourth lens group, a fifth lens group and an aperture. The first lens group, the second lens group, the third lens group, the fourth lens group and the fifth lens group are sequentially arranged from the magnified side to the minified side. The aperture is located between the second lens group and the third lens group. When the zoom lens performs a zoom operation, the aperture, the first lens group and the third lens group are fixed and the second lens group, the fourth lens group and the fifth lens group are moved, and a moving distance of the fourth lens group on an optical axis of the zoom lens is less than 5 mm.

An embodiment of the present invention provides a zoom lens, which includes a first lens group, a second lens group, a third lens group, a fourth lens group, a fifth lens group and an aperture. The first lens group, the second lens group, the third lens group, the fourth lens group and the fifth lens group are sequentially arranged from the magnified side to the minified side. The aperture is disposed between the second lens group and the third lens group. When the zoom lens performs a zoom operation, the aperture, the first lens group, the third lens group and the fifth lens group are fixed and the second lens group and the fourth lens group are moved. There are three aspheric lenses between the aperture and an imaging plane of the zoom lens.

According to the embodiments, by using a positive lens having an Abbe number greater than 45 to correct the chromatic aberration, the displacement of the visible light and infrared on the focal plane can be reduced, so that the zoom lens has a good day-and-night confocal characteristics. By using an aspheric lens, the aberration caused by a large aperture can be eliminated. In addition, the moving distance of the fourth lens group on the optical axis is less than 5 mm, so that the zoom lens can have a large aperture at the telephoto end. Therefore, the zoom lens of embodiments can have both of the good optical imaging quality and the 24-hours confocal image-capturing capability, and can achieve the requirements of wide-angle and large aperture.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
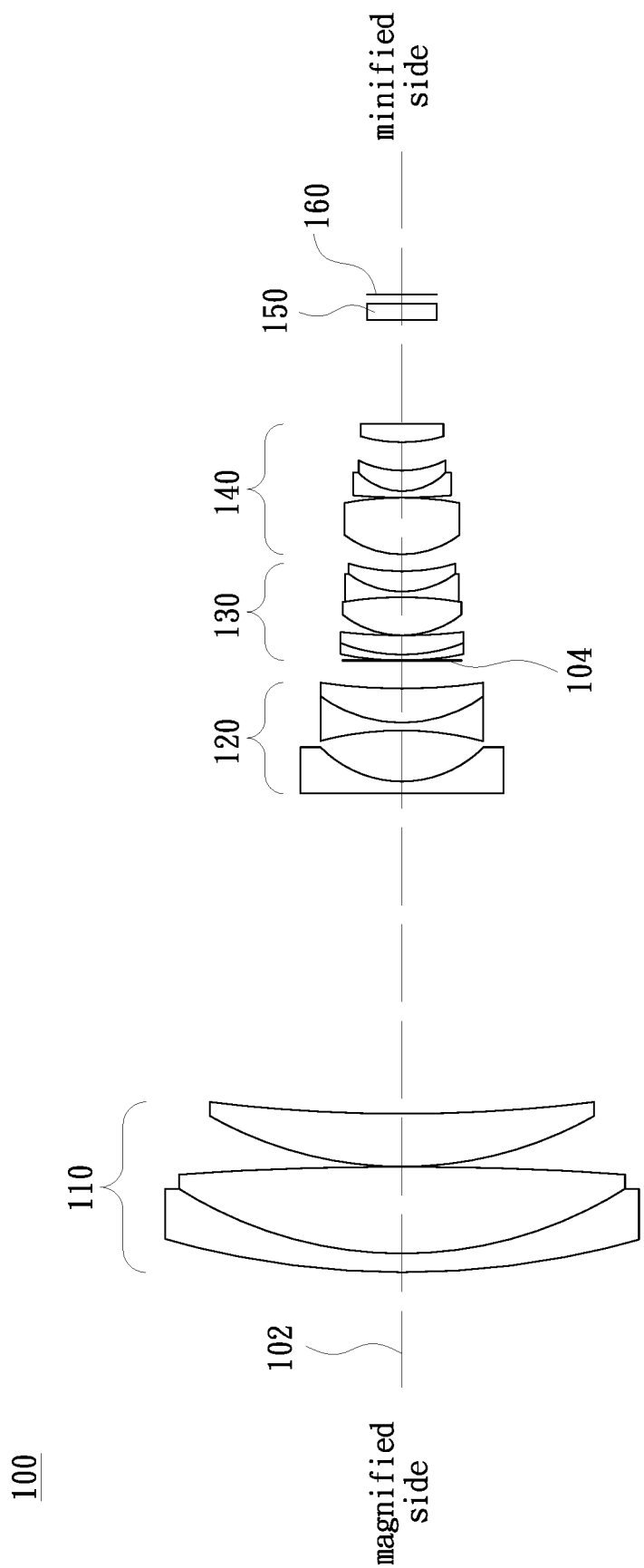
FIGS. 1A and 1B are schematic views of a zoom lens at the wide-angle end and the telephoto end in accordance with the first embodiment of the present invention, respectively.
Figure 1B:
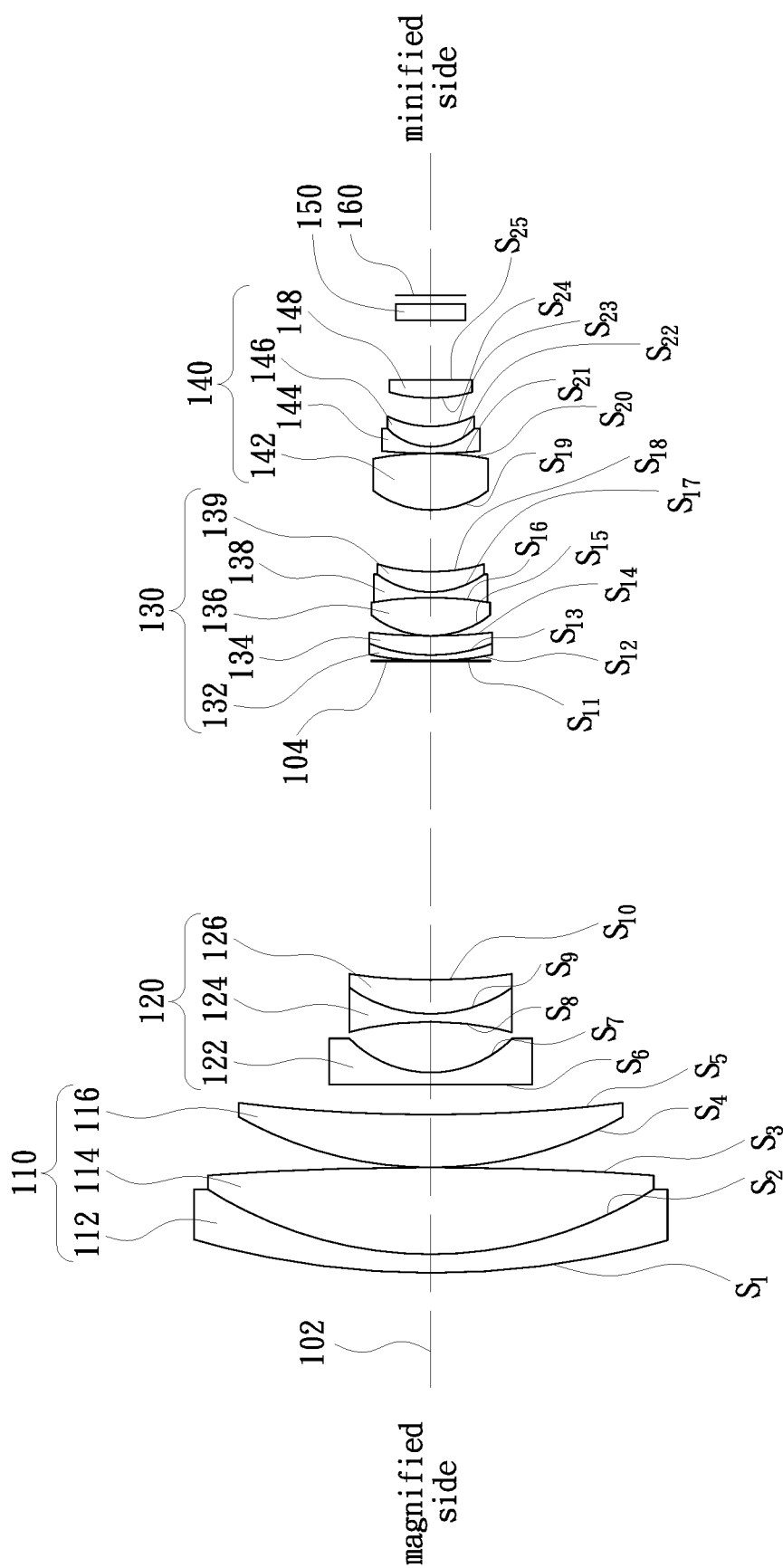

FIGS. 1A and 1B are schematic views of a zoom lens at the wide-angle end and the telephoto end in accordance with the first embodiment of the present invention, respectively. Please refer to FIGS. 1A and 1B. In the present embodiment, the zoom lens 100 includes a first lens group 110, a second lens group 120, a third lens group 130, a fourth lens group 140, a cover glass 150, an imaging plane 160, and an aperture 104 located between the second lens group 120 and the third lens group 130. The term "lens group" herein is for the description only and is not intended to limit the preset invention, and the term does not limit the meaning of the grouping of lenses.

The first lens group 110 includes a first lens 112, a second lens 114 and a third lens 116 sequentially arranged along an optical axis 102 from a magnified side (left side in FIG. 1B) to a minified side (right side in FIG. 1B). The second lens group 120 includes a fourth lens 122, a fifth lens 124 and a sixth lens 126 sequentially arranged from the magnified side to the minified side. The third lens group 130 includes a seventh lens 132, an eighth lens 134, a ninth lens 136, a tenth lens 138 and an eleventh lens 139 sequentially arranged from the magnified side to the minified side 132. The fourth lens group 140 includes a twelfth lens 142, a thirteenth lens 144, a fourteenth 146 and a fifteenth lens 148 sequentially arranged from the magnified side to the minified side. The refractive powers of the first lens 112 to the fifteenth lens 148 are negative, positive, positive, negative, negative, positive, negative, positive, positive, negative, positive, positive, negative, positive and positive, respectively. In the present embodiment, the twelfth lens 142 and the fifteenth lens 148 in the fourth lens group 140 are aspheric lenses. The first lens 112 and the second lens 114 form a doulet lens. The fifth lens 124 and the sixth lens 126 form a doulet lens. The seventh lens 132 and the eighth lens 134 form a doulet lens. The ninth lens 136, the tenth lens 138 and the eleventh lens 139 form a triplet lens. The thirteenth lens 144 and the fourteenth lens 146 form a doulet lens.

The adjoining surfaces respectively on two adjacent lenses may have an identical or similar radius of curvature and may be joined together to form a cemented doublet or triplet lens, but the invention is not limited thereto. Note that the lenses in a cemented lens may be joined together by various ways. For example, the lenses may be cemented together by applying an optical adhesive on adjoining lens surfaces, or stacked with each other and then pressed by a mechanical piece to be fitted with each other.

In the zoom lens 100, the first lens 112 has a convex surface S1 facing the magnified side. The second lens 114 has a convex surface S2 facing the magnified side and a convex surface S3 facing the minified side. The third lens 116 has a convex surface S4 facing the magnified side and a concave surface S5 facing the minified side. The fourth lens 122 has a concave surface S6 facing the magnified side and a concave surface S7 facing the minified side. The fifth lens 124 has a concave surface S8 facing the magnified side. The sixth lens 126 has a convex surface S9 facing the magnified side and a concave surface S10 facing the minified side. The aperture 104 has a surface S11. The seventh lens 132 has a convex surface S12 facing the magnified side. The eighth lens 134 has a convex surface S13 facing the magnified side and a concave surface S14 facing the minified side. The ninth lens 136 has a convex surface S15 facing the magnified side. The tenth lens 138 has a concave surface S16 facing the magnified side. The eleventh lens 139 has a convex surface S17 facing the magnified side and a concave surface S18 facing the minified side. The twelfth lens 142 has a convex surface S19 facing the magnified side and a convex surface S20 facing the minified side. The thirteenth lens 144 has a convex surface S21 facing the magnified side. The fourteenth lens 146 has a convex surface S22 facing the magnified side and a concave surface S23 facing the minified side. The fifteenth lens 148 has a convex surface S24 facing the magnified side and a concave surface S25 facing the minified side.

The lens design parameters of the zoom lens 100 are shown in Tables 1 and 2. However, the data set forth below is not intended to limit the present invention, and any person of ordinary skill in the art may modify the parameters or settings after reference to the present invention, and the modified parameters or settings are still within the scope of the present invention.

TABLE 1

| Surface | Radius of curvature (mm) | Interval (mm) | Refractive index | Abbe number | Lens diameter | Remarks |
|---|---|---|---|---|---|---|
| S1 | 82.2 | 1.9 | 1.85 | 23.8 | 45.5 | First lens (meniscus lens) |
| S2 | 39.6 | 8.3 | 1.5 | 81.6 | 42.3 | Second lens (bi-convex lens) |
| S3 | −309.4 | 0.1 | | | 41.5 | |
| S4 | 37.1 | 5.2 | 1.74 | 44.8 | 36.8 | Third lens (meniscus lens) |
| S5 | 167.0 | d1 | | | 36.0 | |
| S6 | −174.4 | 0.9 | 1.91 | 35.2 | 21.0 | Fourth lens (bi-concave lens) |
| S7 | 11.8 | 4.9 | | | 16.6 | |
| S8 | −26.7 | 0.8 | 1.49 | 70.2 | 16.5 | Fifth lens (bi-concave lens) |
| S9 | 14.2 | 2.9 | 1.92 | 18.9 | 16.8 | Sixth lens (meniscus lens) |
| S10 | 41.1 | d2 | | | 16.5 | |
| S11 | ∞ | 0.1 | | | 11.6 | Aperture 104 |
| S12 | 35.4 | 0.6 | 1.74 | 27.8 | 11.8 | Seventh lens (meniscus lens) |
| S13 | 19.0 | 1.8 | 1.92 | 18.9 | 11.8 | Eighth lens (meniscus lens) |
| S14 | 120.0 | 0.1 | | | 11.8 | |
| S15 | 10.2 | 3.5 | 1.44 | 94.9 | 12.0 | Ninth lens (bi-convex lens) |
| S16 | −29.0 | 0.6 | 1.72 | 34.7 | 11.6 | Tenth lens (bi-concave lens) |
| S17 | 9.2 | 1.8 | 1.5 | 81.6 | 10.9 | Eleventh lens (meniscus lens) |
| S18 | 14.8 | d3 | | | 10.9 | |
| S19 | 9.4 | 6.1 | 1.74 | 49 | 11.2 | Twelfth lens (aspheric lens) |
| S20 | −19.0 | 0.1 | | | 9.8 | |
| S21 | 85.5 | 0.6 | 1.85 | 23.8 | 9.3 | Thirteenth lens (meniscus lens) |
| S22 | 5.4 | 2.2 | 1.74 | 44.8 | 8.2 | Fourteenth lens (meniscus lens) |
| S23 | 8.2 | 2.5 | | | 7.7 | |
| S24 | 13.7 | 1.9 | 1.84 | 23.5 | 8.0 | Fifteenth lens (aspheric lens) |
| S25 | 125.2 | d4 | | | 7.9 | |
| | ∞ | | | | | Imaging plane 160 |

The interval of S1 is referred to as the distance from the surface S1 to the surface S2 on the optical axis 104; the interval of S2 is referred to as the distance from the surface S2 to the surface S3 on the optical axis 104; and the interval of S25 is referred to as the distance from the surface S25 to the imaging plane 160 on the optical axis 104.

| Variable distance | d1 | d2 | d3 | d4 |
|---|---|---|---|---|
| Wide-angle end | 1.7 | 31.2 | 6.5 | 5.8 |
| Middle end | 25.3 | 7.7 | 1.7 | 10.6 |
| Telephoto end | 30.2 | 2.7 | 1.9 | 10.4 |

TABLE 2

| | F/# | EFL(mm) | FOV |
|---|---|---|---|
| Wide-angle end | 1.5 | 5.25 | 58.9 |
| Middle end | 1.89 | 30 | 10.3 |
| Telephoto end | 1.91 | 47.8 | 6.4 |

F/#: aperture value; EFL: effective focal length for visible light; FOV: Maximum field of view.

In addition, in each of the following design examples of the present invention, the aspheric polynomial can be expressed by the following formula:

$$x = \frac{c'y^2}{1 + \sqrt{1-(1+k)c'^2y^2}} + Ay^4 +$$
$$By^6 + Cy^8 + Dy^{10} + Ey^{12} + Fy^{14} + Gy^{16} \ldots$$

In the above formula, x denotes a sag of an aspheric surface along the optical axis 102, c' denotes a reciprocal of a radius of an osculating sphere, k denotes a Conic constant, y denotes a height of the aspheric surface measured in a direction perpendicular to the optical axis 102, and parameters A-G are $4^{th}$, $6^{th}$, $8^{th}$, $10^{th}$, $12^{th}$, $14^{th}$, and $16^{th}$ order aspheric coefficients. Table 3 lists the aspheric coefficient of each order and the Conic constant values of the lens surfaces.

TABLE 3

|  | K | A | B | C | D | E |
|---|---|---|---|---|---|---|
| S19 | 0 | −7.53E−05 | 5.46E−07 | −2.52E−08 | 6.01E−10 | 6.14E−12 |
| S20 | 0 | 4.46E−04 | −4.42E−06 | 4.59E−08 | 1.49E−09 | 1.77E−11 |
| S24 | 0 | 2.65E−04 | −4.14E−06 | −3.56E−07 | 8.86E−09 | — |
| S25 | 0 | 5.40E−05 | −1.13E−06 | −4.56E−07 | 1.09E−08 | — |

Figure 2A:
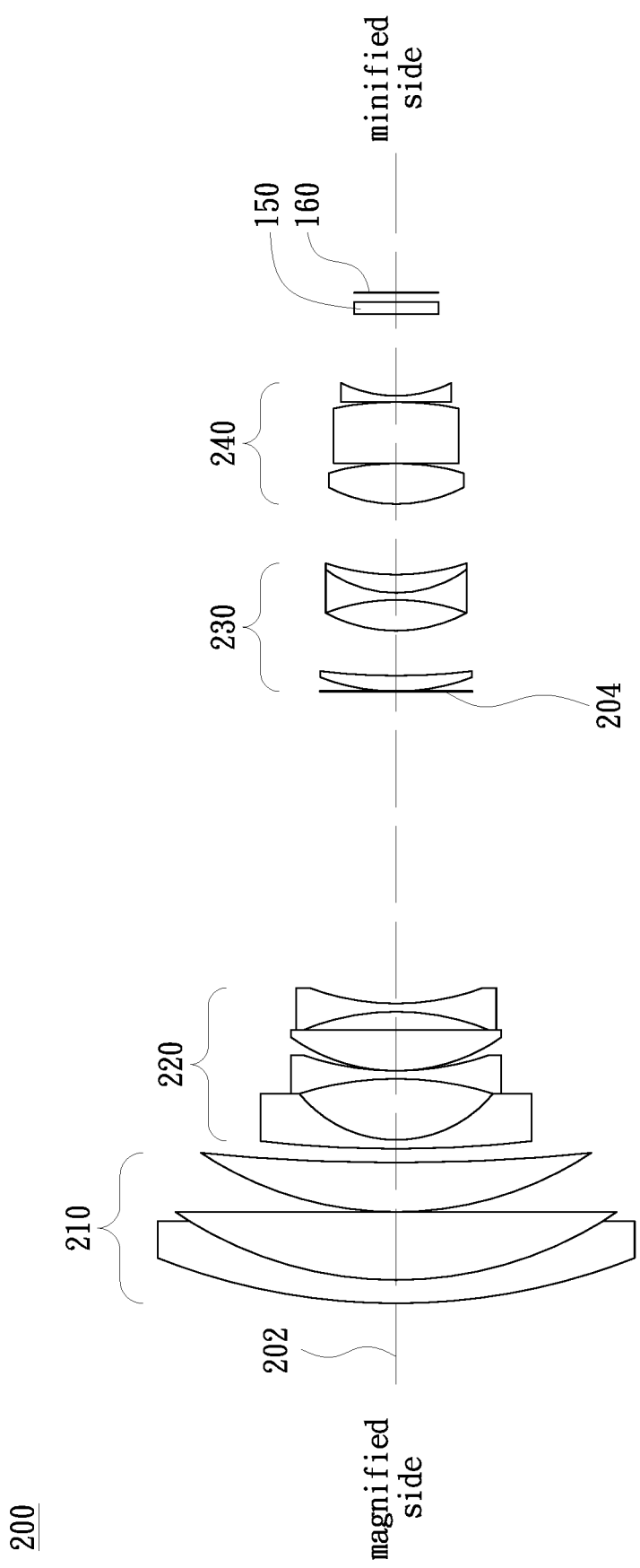
FIGS. 2A and 2B are schematic views of a zoom lens at the wide-angle end and the telephoto end in accordance with the second embodiment of the present invention, respectively.
Figure 2B:
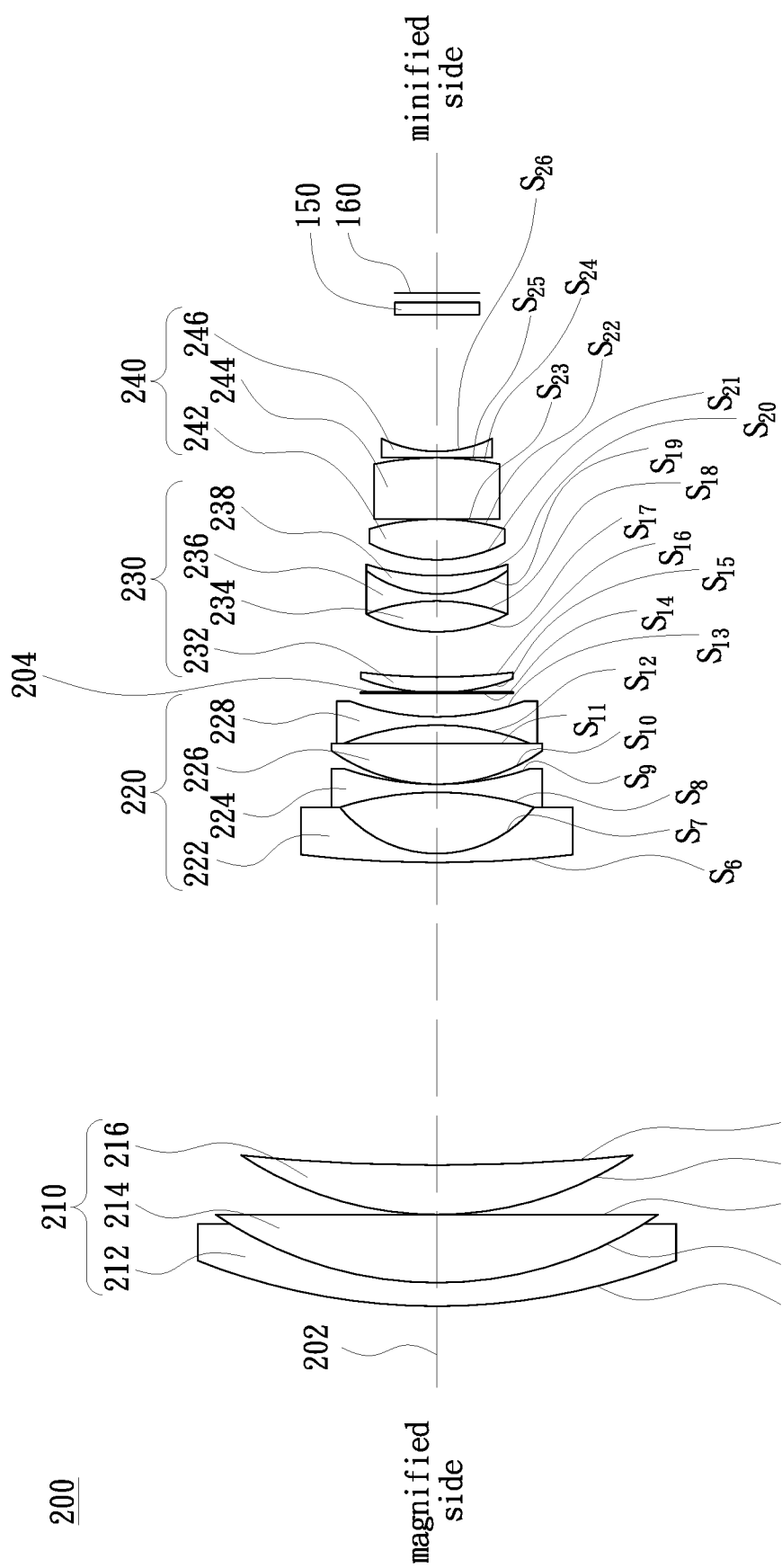

As shown in FIGS. 2A and 2B, the zoom lens 200 of the second embodiment of the present invention includes a first lens to a fourteenth lens (the refractive powers thereof are negative, positive, positive, negative, negative, positive, negative, positive, positive, negative, positive, positive, positive and negative, respectively). The first lens group 210 includes a first lens 212, a second lens 214 and a third lens 216 sequentially arranged along the optical axis 202 from the magnified side (left side in FIG. 2B) to the minified side (right side in FIG. 2B). The second lens group 220 includes a fourth lens 222, a fifth lens 224, a sixth lens 226 and a seventh lens 228 sequentially arranged from the magnified side to the minified side. The third lens group 230 includes an eighth lens 232, a ninth lens 234, a tenth lens 236 and an eleventh lens 238 sequentially arranged from the magnified side to the minified side. The fourth lens group 240 includes a twelfth lens 242, a thirteenth lens 244 and a fourteenth lens 246 sequentially arranged from the magnified side to the minified side. The first lens 212 and the second lens 214 form a doulet lens. The ninth lens 234, the tenth lens 236 and the eleventh lens 238 form a triple lens. The twelfth lens 242 and the fourteenth lens 246 are aspheric lenses. The lens design parameters of the zoom lens 200 are shown in Tables 4 and 5, and the aspheric coefficients of the aspheric lenses are shown in Table 6.

TABLE 4

| Surface | Radius of curvature (mm) | Interval (mm) | Refractive index | Abbe number | Lens diameter | Remarks |
|---|---|---|---|---|---|---|
| S1 | 62.7 | 1.9 | 1.85 | 23.8 | 41.8 | First lens (meniscus lens) |
| S2 | 37.9 | 6.5 | 1.5 | 81.6 | 39.3 | Second lens (bi-convex lens) |
| S3 | −806.6 | 0.1 | | | 38.8 | |
| S4 | 35.1 | 4.2 | 1.62 | 63.3 | 34.4 | Third lens (meniscus lens) |
| S5 | 147.9 | d1 | | | 34.0 | |
| S6 | 102.4 | 0.9 | 1.85 | 31.6 | 23.1 | Fourth lens (meniscus lens) |
| S7 | 11.4 | 5.7 | | | 17.7 | |
| S8 | −31.7 | 0.8 | 1.5 | 81.6 | 17.6 | Fifth lens (bi-concave lens) |
| S9 | 30.1 | 0.1 | | | 17.3 | |
| S10 | 17.3 | 3.5 | 1.92 | 18.9 | 17.5 | Sixth lens (meniscus lens) |
| S11 | 1858.3 | 1.7 | | | 16.9 | |
| S12 | −24.7 | 0.8 | 1.49 | 84.5 | 16.7 | Seventh lens (bi-concave lens) |
| S13 | 24.5 | d2 | | | 15.6 | |
| S14 | ∞ | 0.1 | | | 12.0 | Aperture 204 |
| S15 | 21.0 | 1.6 | 1.92 | 18.9 | 12.3 | Eighth lens (meniscus lens) |
| S16 | 80.8 | 4.1 | | | 12.1 | |
| S17 | 15.5 | 2.8 | 1.5 | 81.6 | 11.5 | Ninth lens (bi-convex lens) |
| S18 | −19.4 | 0.6 | 1.85 | 23.8 | 11.2 | Tenth lens (bi-concave lens) |
| S19 | 10.1 | 1.8 | 1.83 | 42.7 | 10.7 | Eleventh lens (meniscus lens) |
| S20 | 21.7 | d3 | | | 10.6 | |
| S21 | 11.9 | 3.7 | 1.68 | 52.8 | 10.9 | Twelfth lens (aspheric lens) |
| S22 | −20.5 | 0.1 | | | 10.4 | |
| S23 | 407.0 | 5.4 | 1.92 | 18.9 | 10.1 | Thirteenth lens (meniscus lens) |
| S24 | −47.2 | 0.1 | | | 9.1 | |
| S25 | 168.4 | 0.8 | 1.68 | 31 | 8.9 | Fourteenth lens (aspheric lens) |
| S26 | 13.0 | d4 | | | 8.3 | |
| | ∞ | | | | | Imaging plane |

| Variable distance | d1 | d2 | d3 | d4 |
|---|---|---|---|---|
| Wide-angle end | 1.3 | 28.7 | 6.5 | 7.4 |
| Middle end | 24.0 | 6.1 | 1.8 | 12.2 |
| Telephoto end | 27.9 | 2.2 | 1.1 | 12.8 |

TABLE 5

| | F/# | EFL(mm) | FOV |
|---|---|---|---|
| Wide-angle end | 1.47 | 5.8 | 52.4 |
| Middle end | 1.96 | 30.4 | 10 |
| Telephoto end | 2 | 45.3 | 6.6 |

Zoom ratio: 7.81

TABLE 6

| | K | A | B | C | D | E |
|---|---|---|---|---|---|---|
| S21 | 0 | −9.05E−05 | −6.31E−07 | −2.35E−08 | 5.55E−10 | −7.48E−12 |
| S22 | 0 | 1.32E−04 | −1.52E−06 | −1.81E−08 | 8.97E−10 | −1.08E−11 |
| S25 | 0 | 1.53E−04 | 4.42E−08 | −1.58E−07 | 6.87E−09 | −3.81E−11 |
| S26 | 0 | 2.55E−04 | 3.29E−06 | 2.21E−08 | −5.49E−09 | 3.39E−10 |

Figure 3:
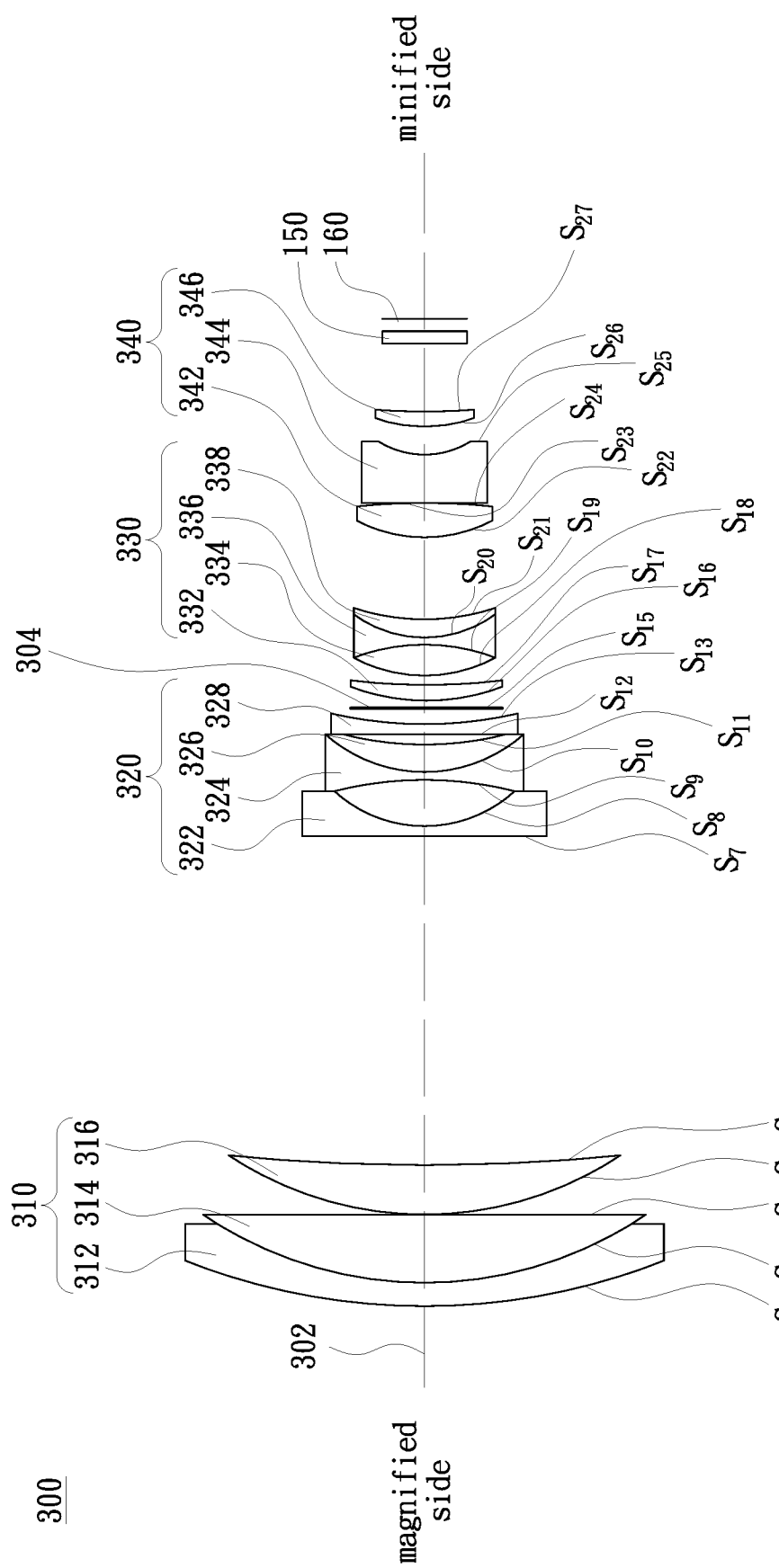
FIGS. 3 to 11 are schematic views of the zoom lens in accordance with the third to eleventh embodiments of the present invention, respectively.

As shown in FIG. 3, the zoom lens 300 of the third embodiment of the present invention includes a first lens to a fourteenth lens (the refractive powers thereof are negative, positive, positive, negative, negative, positive, negative, positive, positive, negative, positive, positive, negative and positive, respectively). The first lens group 310 includes a first lens 312, a second lens 314 and a third lens 316 sequentially arranged along the optical axis 302 from the magnified side (left side in FIG. 3) to the minified side (right side in FIG. 3). The second lens group 320 includes a fourth lens 322, a fifth lens 324, a sixth lens 326 and a seventh lens 328 sequentially arranged from the magnified side to the minified side. The third lens group 330 includes an eighth lens 332, a ninth lens 334, a tenth lens 336 and an eleventh lens 338 sequentially arranged from the magnified side to the minified side. The fourth lens group 340 includes a twelfth lens 342, a thirteenth lens 344 and a fourteenth lens 346 sequentially arranged from the magnified side to the minified side. The first lens 312 and the second lens 314 form a doulet lens. The fifth lens 324 and the sixth lens 326 form a doulet lens. The ninth lens 334, the tenth lens 336 and the eleventh lens 338 form a triple lens. The twelfth lens 342 and the fourteenth lens 346 are aspheric lenses. The lens design parameters of the zoom lens 300 are shown in Tables 7 and 8, and the aspheric coefficients of the aspheric lenses are shown in Table 9.

TABLE 7

| Surface | Radius of curvature (mm) | Interval (mm) | Refractive index | Abbe number | Lens diameter | Remarks |
|---|---|---|---|---|---|---|
| S1 | 62.0 | 1.9 | 1.85 | 23.8 | 45.1 | First lens (meniscus lens) |
| S2 | 40.1 | 8.1 | 1.5 | 81.6 | 42.4 | Second lens (bi-convex lens) |
| S3 | −548.8 | 0.1 | | | 41.4 | |
| S4 | 38.6 | 5.0 | 1.62 | 63.3 | 36.4 | Third lens (meniscus lens) |
| S5 | 148.5 | d1 | | | 35.6 | |
| S7 | −388.8 | 0.9 | 1.89 | 31.6 | 21.4 | Fourth lens (bi-concave lens) |
| S8 | 12.0 | 4.6 | | | 16.9 | |
| S9 | −37.1 | 0.8 | 1.49 | 70.2 | 16.8 | Fifth lens (bi-concave lens) |
| S10 | 13.9 | 3.1 | 1.92 | 18.9 | 16.6 | Sixth lens (meniscus lens) |
| S11 | 77.3 | 0.9 | | | 16.3 | |
| S12 | −108.2 | 0.8 | 1.72 | 47.6 | 16.2 | Seventh lens (bi-concave lens) |
| S13 | 48.4 | d2 | | | 15.9 | |
| S15 | ∞ | 0.2 | | | 12.0 | Aperture 304 |
| S16 | 20.8 | 1.3 | 1.92 | 18.9 | 12.5 | Eighth lens (meniscus lens) |
| S17 | 41.0 | 0.7 | | | 12.4 | |
| S18 | 13.5 | 2.9 | 1.44 | 94.9 | 12.3 | Ninth lens (bi-convex lens) |
| S19 | −29.4 | 0.6 | 1.72 | 34.7 | 12.1 | Tenth lens (bi-concave lens) |
| S20 | 11.3 | 2.3 | 1.5 | 81.6 | 11.6 | Eleventh lens (meniscus lens) |
| S21 | 145.2 | d3 | | | 11.5 | |
| S22 | 9.9 | 3.0 | 1.69 | 49 | 11.3 | Twelfth lens (aspheric lens) |
| S23 | −31.0 | 0.1 | | | 11.1 | |
| S24 | 177.7 | 4.2 | 1.75 | 24.7 | 10.7 | Thirteenth lens (meniscus lens) |
| S25 | 7.4 | 2.4 | | | 8.3 | |
| S26 | 15.8 | 1.5 | 1.84 | 42 | 8.6 | Fourteenth lens (aspheric lens) |
| S27 | −703.1 | d4 | | | 8.6 | |
| | ∞ | | | | | Imaging plane |

| Variable distance | d1 | d2 | d3 | d4 |
|---|---|---|---|---|
| Wide-angle end | 2.0 | 30.6 | 6.9 | 5.9 |
| Middle end | 26.0 | 6.7 | 2.1 | 10.9 |
| Telephoto end | 30.5 | 2.1 | 1.2 | 11.6 |

TABLE 8

| | F/# | EFL(mm) | FOV |
|---|---|---|---|
| Wide-angle end | 1.5 | 5.5 | 54.6 |
| Middle end | 1.86 | 29.3 | 10.4 |
| Telephoto end | 1.9 | 47.9 | 6.4 |

Zoom ratio: 8.7

TABLE 9

| | K | A | B | C | D |
|---|---|---|---|---|---|
| S22 | 0 | −6.83E−05 | −2.23E−07 | −1.47E−08 | −3.71E−11 |
| S23 | 0 | 1.84E−04 | −2.27E−06 | 9.07E−09 | 4.37E−11 |
| S26 | 0 | 1.93E−04 | −4.21E−06 | −1.77E−07 | 4.47E−10 |
| S27 | 0 | 1.51E−04 | −3.97E−06 | −1.96E−07 | 9.26E−10 |

Figure 4:
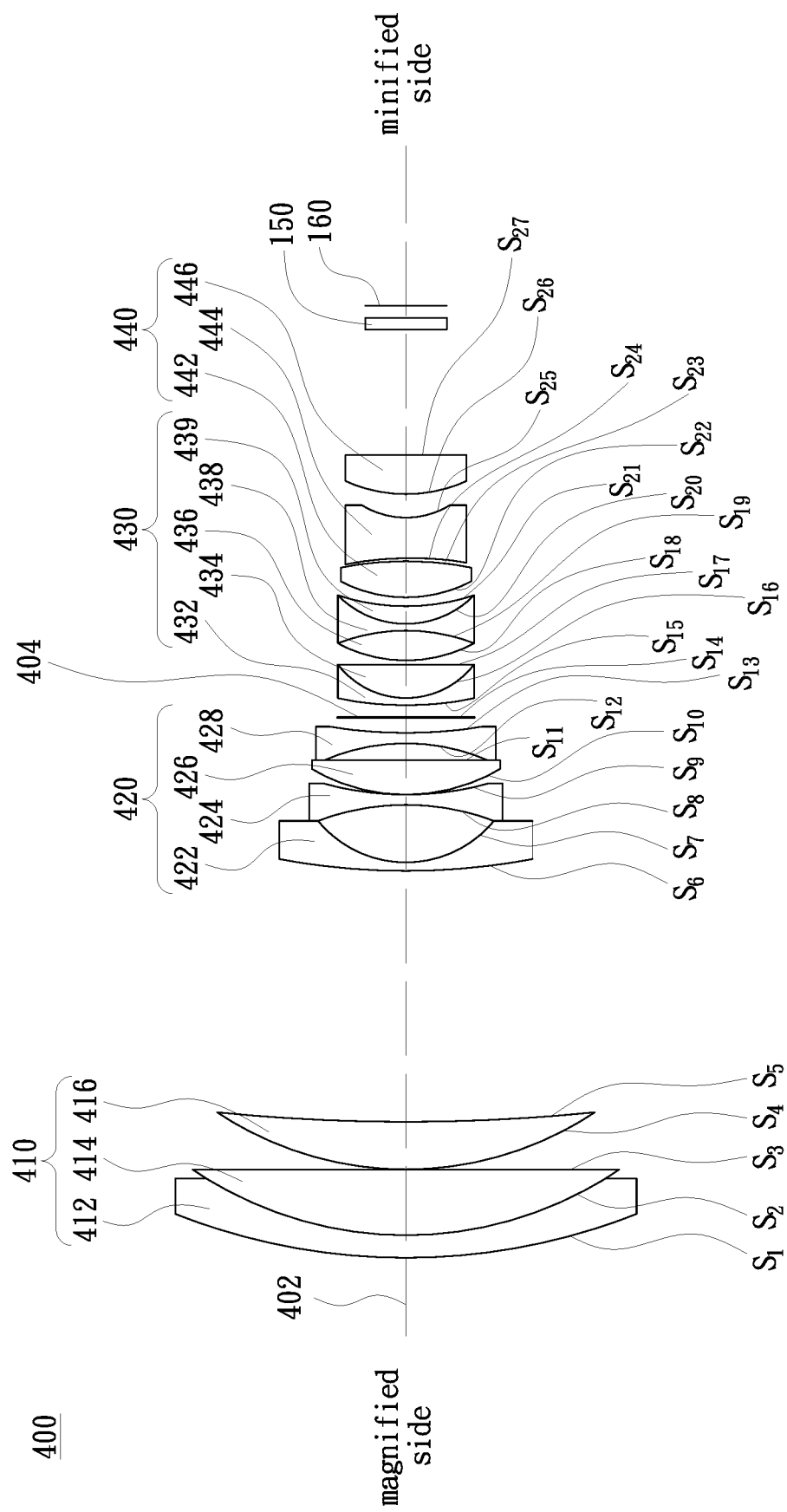

As shown in FIG. 4, the zoom lens 400 of the fourth embodiment of the present invention includes a first lens to a fifteenth lens (the refractive powers thereof are negative, positive, positive, negative, negative, positive, negative, negative, positive, positive, negative, positive, positive, negative and positive, respectively) sequentially arranged along the optical axis 402. The first lens group 410 includes a first lens 412, a second lens 414 and a third lens 416. The second lens group 420 includes a fourth lens 422, a fifth lens 424, a sixth lens 426 and a seventh lens 428. The third lens group 430 includes an eighth lens 432, a ninth lens 434, a tenth lens 436, an eleventh lens 438 and a twelfth lens 439. The fourth lens group 440 includes a thirteenth lens 442, a fourteenth lens 444 and a fifteenth lens 446. The lens design parameters of the zoom lens 400 are shown in Tables 10 and 11, and the aspheric coefficients of the aspheric lenses are shown in Table 12.

TABLE 10

| Surface | Radius of curvature (mm) | Interval (mm) | Refractive index | Abbe number | Lens diameter | Remarks |
|---|---|---|---|---|---|---|

TABLE 10-continued

| | | | | | |
|---|---|---|---|---|---|
| S1 | 58.2 | 1.9 | 1.85 | 23.8 | 42.2 First lens (meniscus lens) |
| S2 | 34.9 | 7.0 | 1.5 | 81.6 | 38.4 Second lens (bi-convex lens) |
| S3 | −782.4 | 0.1 | | | 37.4 |
| S4 | 32.3 | 4.9 | 1.61 | 56.5 | 31.6 Third lens (meniscus lens) |
| S5 | 140.9 | d1 | | | 30.7 |
| S6 | 69.7 | 0.9 | 1.89 | 33.6 | 22.6 Fourth lens (meniscus lens) |
| S7 | 11.3 | 5.7 | | | 17.3 |
| S8 | −25.1 | 0.8 | 1.5 | 81.6 | 17.1 Fifth lens (bi-concave lens) |
| S9 | 26.4 | 0.1 | | | 16.5 |
| S10 | 17.7 | 3.4 | 1.92 | 20 | 16.6 Sixth lens (bi-convex lens) |
| S11 | −622.5 | 1.7 | | | 16.0 |
| S12 | −20.1 | 0.8 | 1.49 | 84 | 15.8 Seventh lens (bi-concave lens) |
| S13 | 32.8 | d2 | | | 15.0 |
| S14 | ∞ | 0.2 | | | 11.1 Aperture 404 |
| S15 | 28.1 | 0.6 | 1.89 | 25.8 | 11.4 Eighth lens (meniscus lens) |
| S16 | 8.0 | 3.3 | 1.92 | 18.9 | 11.5 Ninth lens (meniscus lens) |
| S17 | 146.6 | 0.1 | | | 11.4 |
| S18 | 11.8 | 3.7 | 1.44 | 94.9 | 11.5 Tenth lens (bi-convex lens) |
| S19 | −23.5 | 0.6 | 1.81 | 21.5 | 11.0 Eleventh lens (bi-concave lens) |
| S20 | 8.3 | 1.9 | 1.77 | 45 | 10.6 Twelfth lens (meniscus lens) |
| S21 | 15.1 | d3 | | | 10.5 |
| S22 | 9.9 | 3.8 | 1.77 | 44.8 | 10.9 Thirteenth lens (aspheric lens) |
| S23 | −15.1 | 0.3 | | | 10.3 |
| S24 | −16.4 | 4.4 | 1.82 | 21.1 | 10.0 Fourteenth lens (aspheric lens) |
| S25 | 15.1 | 1.9 | | | 8.9 |
| S26 | 12.4 | 3.6 | 1.92 | 19 | 10.0 Fifteenth lens (meniscus lens) |
| S27 | 59.2 | d4 | | | 9.5 |
| | ∞ | | | | Imaging plane |

| Variable distance | d1 | d2 | d3 | d4 |
|---|---|---|---|---|
| Wide-angle end | 1.2 | 25.4 | 6.5 | 6.2 |
| Middle end | 20.9 | 5.7 | 1.2 | 11.6 |
| Telephoto end | 24.4 | 2.2 | 0.1 | 12.5 |

TABLE 11

| | F/# | EFL(mm) | FOV |
|---|---|---|---|
| Wide-angle end | 1.5 | 5.8 | 52.4 |
| Middle end | 1.99 | 30.4 | 10.4 |
| Telephoto end | 2.08 | 46.3 | 6.6 |

Zoom ratio: 8

TABLE 12

| | K | A | B | C |
|---|---|---|---|---|
| S22 | 0 | −6.99E−05 | −9.72E−07 | 9.49E−09 |
| S23 | 0 | 3.35E−04 | −6.56E−07 | −1.28E−08 |
| S24 | 0 | 4.49E−04 | −1.24E−06 | −3.36E−08 |
| S25 | 0 | 4.40E−04 | 1.91E−06 | 4.73E−08 |

Figure 5:
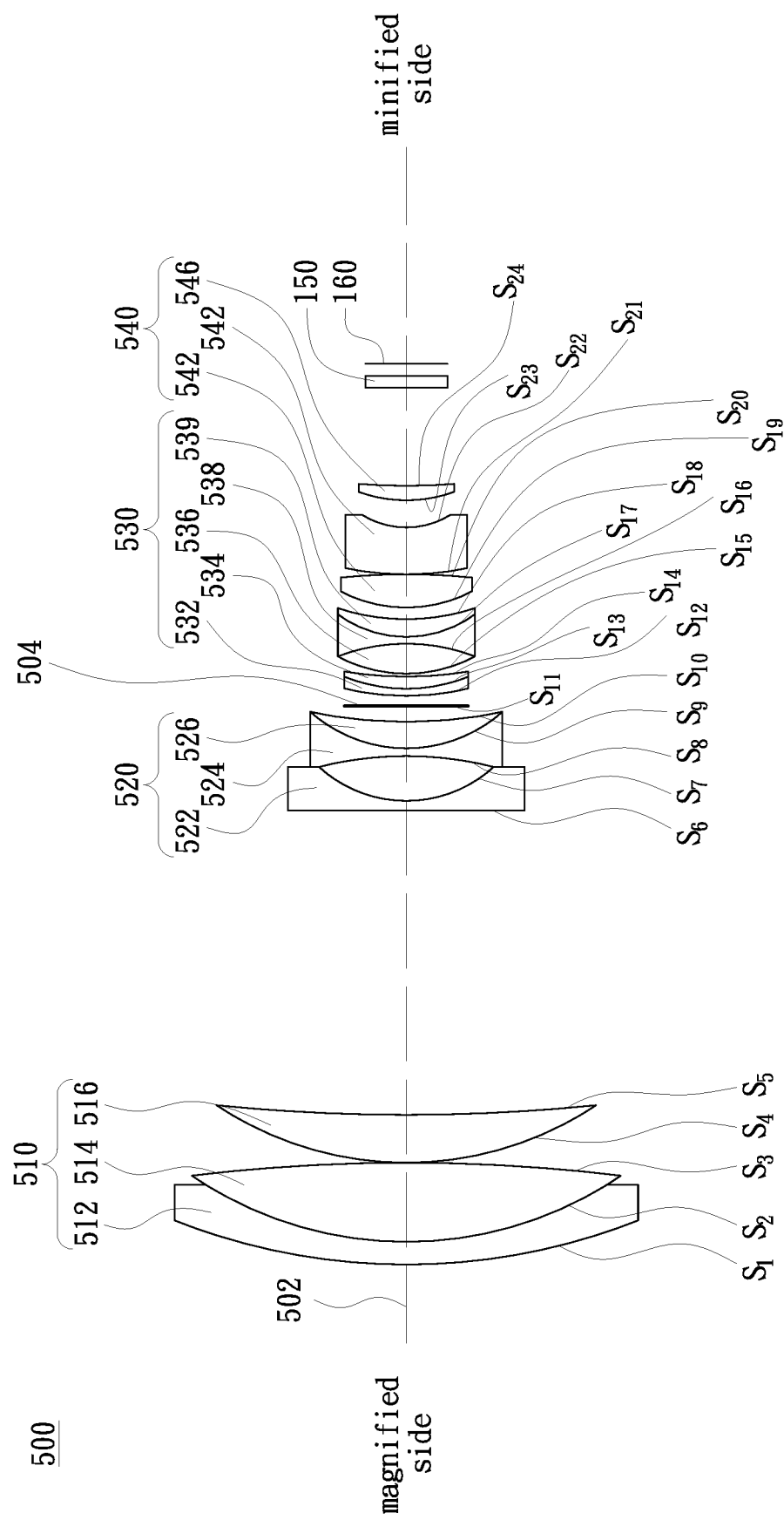

As shown in FIG. 5, the zoom lens 500 of the fifth embodiment of the present invention includes a first lens to a fourteenth lens (the refractive powers thereof are negative, positive, positive, negative, negative, positive, negative, positive, positive, negative, positive, positive, negative and positive, respectively) sequentially arranged along the optical axis 502. The first lens group 510 includes a first lens 512, a second lens 514 and a third lens 516. The second lens group 520 includes a fourth lens 522, a fifth lens 524 and a sixth lens 526. The third lens group 530 includes a seventh lens 532, an eighth lens 534, a ninth lens 536, a tenth lens 538 and an eleventh lens 539. The fourth lens group 540 includes a twelfth lens 542, a thirteenth lens 544 and a fourteenth lens 546. The lens design parameters of the zoom lens 500 are shown in Tables 13 and 14, and the aspheric coefficients of the aspheric lenses are shown in Table 15.

TABLE 13

| Surface | Radius of curvature (mm) | Interval (mm) | Refractive index | Abbe number | Lens diameter | Remarks |
|---|---|---|---|---|---|---|
| S1 | 62.3 | 1.9 | 1.85 | 23.8 | 46.4 | First lens (meniscus lens) |
| S2 | 40.2 | 8.3 | 1.5 | 81.6 | 43.6 | Second lens (bi-convex lens) |
| S3 | −632.2 | 0.1 | | | 42.7 | |
| S4 | 38.3 | 5.0 | 1.62 | 63.3 | 37.2 | Third lens (meniscus lens) |
| S5 | 137.4 | d1 | | | 36.4 | |
| S6 | ∞ | 0.9 | 1.88 | 40.8 | 22.0 | Fourth lens (plano-concave lens) |
| S7 | 11.1 | 5.3 | | | 16.9 | |
| S8 | −30.9 | 0.8 | 1.49 | 70.2 | 16.8 | Fifth lens (bi-concave lens) |
| S9 | 13.4 | 3.0 | 1.92 | 20.9 | 17.1 | Sixth lens (meniscus lens) |
| S10 | 36.2 | d2 | | | 16.8 | |
| S11 | ∞ | 0.1 | | | 11.3 | Aperture 504 |
| S12 | 33.5 | 0.6 | 1.9 | 31.3 | 11.5 | Seventh lens (meniscus lens) |
| S13 | 17.3 | 1.7 | 1.92 | 18.9 | 11.5 | Eighth lens (meniscus lens) |
| S14 | 64.5 | 0.1 | | | 11.4 | |
| S15 | 11.7 | 3.1 | 1.44 | 94.9 | 11.6 | Ninth lens (bi-convex lens) |
| S16 | −22.6 | 0.6 | 1.72 | 34.7 | 11.4 | Tenth lens (bi-concave lens) |
| S17 | 10.1 | 2.2 | 1.5 | 81.6 | 11.1 | Eleventh lens (meniscus lens) |
| S18 | 50.5 | d3 | | | 11.2 | |
| S19 | 9.8 | 3.4 | 1.74 | 49 | 11.6 | Twelfth lens (aspheric lens) |
| S20 | −25.6 | 0.1 | | | 11.3 | |
| S21 | 52.9 | 4.0 | 1.81 | 22.8 | 10.6 | Thirteenth lens (meniscus lens) |
| S22 | 7.4 | 3.1 | | | 7.9 | |
| S23 | 12.7 | 1.5 | 1.85 | 38.8 | 8.0 | Fourteenth lens (aspheric lens) |
| S24 | 45.7 | d4 | | | 7.9 | |
| | ∞ | | | | | Imaging plane |

| Variable distance | d1 | d2 | d3 | d4 |
|---|---|---|---|---|
| Wide-angle end | 2.4 | 31.2 | 5.7 | 6.0 |
| Middle end | 26.5 | 7.1 | 1.5 | 10.3 |
| Telephoto end | 31.6 | 2.0 | 0.9 | 10.8 |

TABLE 14

| | F/# | EFL(mm) | FOV |
|---|---|---|---|
| Wide-angle end | 1.5 | 5.5 | 54.9 |
| Middle end | 1.89 | 29 | 10.5 |
| Telephoto end | 1.91 | 47.6 | 6.3 |

Zoom ratio: 8.7

TABLE 15

| | K | A | B | C | D |
|---|---|---|---|---|---|
| S22 | 0 | −9.23E−05 | −2.40E−07 | −2.25E−08 | 1.40E−10 |
| S23 | 0 | 1.85E−04 | −2.30E−06 | 1.30E−08 | 5.42E−11 |
| S26 | 0 | 2.00E−04 | −5.47E−06 | −2.89E−07 | −5.54E−09 |
| S27 | 0 | 2.11E−04 | −2.77E−06 | −5.60E−07 | 1.98E−09 |

Figure 6:
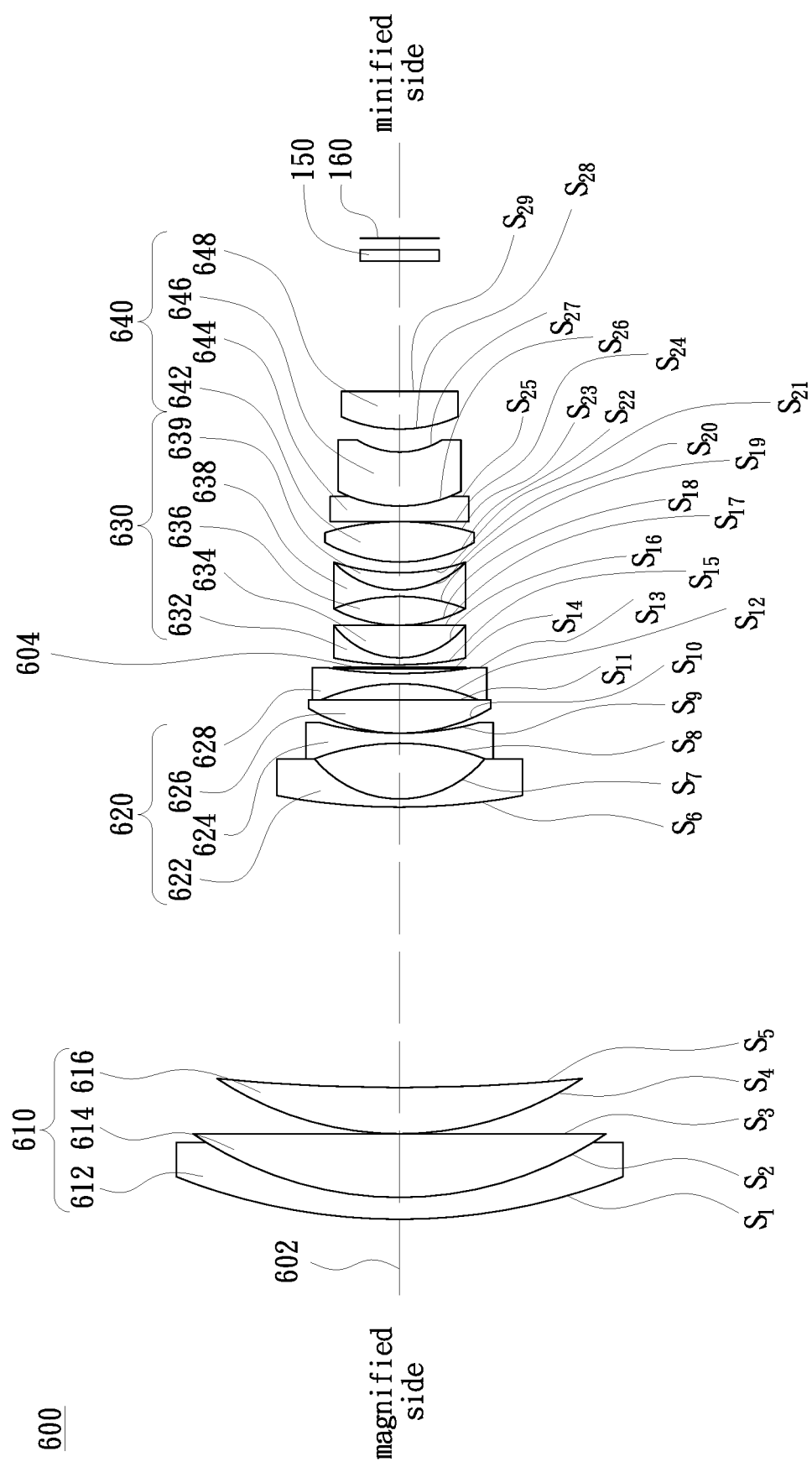

As shown in FIG. 6, the zoom lens 600 of the sixth embodiment of the present invention includes a first lens to a sixteenth lens (the refractive powers thereof are negative, positive, positive, negative, negative, positive, negative, negative, positive, positive, negative, positive, positive, negative, negative and positive, respectively) sequentially arranged along the optical axis 602. The first lens group 610 includes three lenses 612, 614 and 616. The second lens group 620 includes four lenses 622, 624, 626 and 628. The third lens group 630 includes five lenses 632, 634, 636, 638 and 639. The fourth lens group 640 includes four lenses 642, 644, 646 and 648. The lens design parameters of the zoom lens 600 are shown in Tables 16 and 17, and the aspheric coefficients of the aspheric lenses are shown in Table 18.

TABLE 16

| Surface | Radius of curvature (mm) | Interval (mm) | Refractive index | Abbe number | Lens diameter | Remarks |
|---|---|---|---|---|---|---|
| S1 | 63.8 | 1.9 | 1.85 | 23.8 | 40.0 | First lens (meniscus lens) |
| S2 | 36.2 | 6.3 | 1.5 | 81.6 | 37.4 | Second lens (bi-convex lens) |
| S3 | −1294.4 | 0.1 | | | 37.0 | |
| S4 | 33.5 | 4.5 | 1.62 | 55.6 | 33.0 | Third lens (meniscus lens) |
| S5 | 158.8 | d1 | | | 32.5 | |
| S6 | 175.7 | 0.9 | 1.84 | 39 | 22.2 | Fourth lens (meniscus lens) |
| S7 | 12.8 | 5.2 | | | 17.5 | |
| S8 | −25.9 | 0.8 | 1.5 | 81.6 | 17.4 | Fifth lens (bi-concave lens) |
| S9 | 31.0 | 0.1 | | | 16.9 | |
| S10 | 19.2 | 2.9 | 1.92 | 18.9 | 16.9 | Sixth lens (bi-convex lens) |
| S11 | −1205.9 | 1.4 | | | 16.5 | |
| S12 | −27.4 | 0.8 | 1.49 | 83 | 16.3 | Seventh lens (bi-concave lens) |
| S13 | 24.9 | d2 | | | 15.2 | |
| S14 | ∞ | 0.2 | | | 10.7 | Aperture 604 |
| S15 | 53.6 | 0.6 | 1.88 | 24 | 10.9 | Eighth lens (meniscus lens) |
| S16 | 8.3 | 3.0 | 1.92 | 18.9 | 11.2 | Ninth lens (meniscus lens) |
| S17 | 443.9 | 0.1 | | | 11.3 | |
| S18 | 13.4 | 3.2 | 1.44 | 94.9 | 11.5 | Tenth lens (bi-convex lens) |
| S19 | −19.0 | 0.6 | 1.8 | 23.8 | 11.4 | Eleventh lens (bi-concave lens) |
| S20 | 10.4 | 2.1 | 1.68 | 50.2 | 11.4 | Twelfth lens (meniscus lens) |
| S21 | 34.7 | d3 | | | 11.5 | |
| S22 | 12.8 | 3.5 | 1.74 | 46.2 | 12.5 | Thirteenth lens (aspheric lens) |
| S23 | −27.1 | 0.1 | | | 12.2 | |
| S24 | 104.0 | 1.6 | 1.73 | 24.5 | 11.4 | Fourteenth lens (meniscus lens) |
| S25 | 14.5 | 0.2 | | | 10.3 | |
| S26 | 14.3 | 5.1 | 1.88 | 40.8 | 10.2 | Fifteenth lens (meniscus lens) |
| S27 | 8.6 | 1.8 | | | 8.8 | |
| S28 | 12.3 | 4.0 | 1.88 | 40 | 9.9 | Sixteenth lens (meniscus lens) |
| S29 | 309.4 | d4 | | | 9.5 | |
| | ∞ | | | | | Imaging plane |

TABLE 16-continued

| Variable distance | d1 | d2 | d3 | d4 |
|---|---|---|---|---|
| Wide-angle end | 1.6 | 25.4 | 6.7 | 6.1 |
| Middle end | 22.7 | 4.3 | 1.4 | 11.5 |
| Telephoto end | 26.3 | 0.8 | 0.1 | 12.6 |

TABLE 17

| | F/# | EFL(mm) | FOV |
|---|---|---|---|
| Wide-angle end | 1.5 | 5.9 | 52.5 |
| Middle end | 1.92 | 30.8 | 10.0 |
| Telephoto end | 2.05 | 46.5 | 6.6 |

Zoom ratio: 8

TABLE 18

| | K | A | B | C |
|---|---|---|---|---|
| S22 | 0 | −7.51E−05 | −2.00E−09 | −3.26E−10 |
| S23 | 0 | 5.84E−05 | −9.18E−08 | 1.18E−09 |

In the first to sixth embodiments described above, the aperture is fixed and the second lens group and the fourth lens group are movable relative to the imaging plane so as to switch between the wide-angle end and the telephoto end. Specifically, when the second lens group moves toward the imaging plane and the fourth lens group moves away from the imaging plane, the zoom lens is switched from the wide-angle end to the telephoto end, the variable intervals d1 and d4 of the zoom lens become larger, and variable intervals d2 and d3 become smaller. Alternatively, when the second lens group moves away from the imaging plane and the fourth lens group moves toward the imaging plane, the zoom lens is switched from the telephoto end to the wide-angle end, the variable intervals d1 and d4 of the zoom lens become smaller, and variable intervals d2 and d3 become larger. The second lens group and the fourth lens group can move in the optical axis direction to perform the zoom operation, and the fourth lens group can move in the optical axis direction to perform the focus operation. In one embodiment, the moving distance of the fourth lens group on the optical axis is less than 5 mm.

According to the above-described embodiment, the zoom lens has four lens groups and can achieve the requirement of wide angle and large aperture. By using the third lens group including a positive lens having an Abbe number greater than 45 to correct the chromatic aberration, the displacement of the visible light and infrared on the focal plane can be reduced, so that the zoom lens has a good day-and-night confocal characteristics. By using the fourth lens group including an aspheric lens, the aberration caused by a large aperture can be eliminated. In addition, the moving distance of the fourth lens group on the optical axis is less than 5 mm, so that the zoom lens can have a large aperture at the telephoto end. Therefore, the zoom lens of the first to sixth embodiments can have both of the good optical imaging quality and the 24-hours confocal image-capturing capability.

Figure 7:
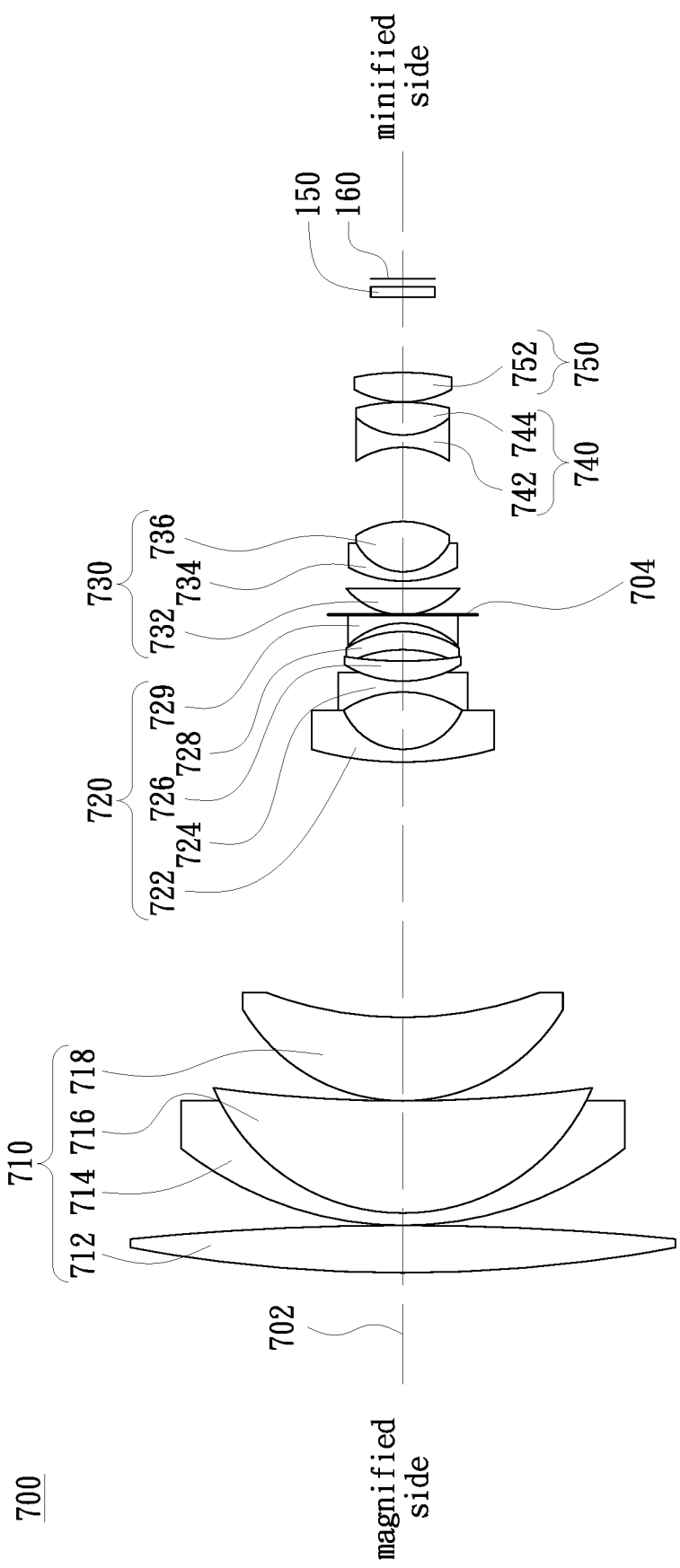

As shown in FIG. 7, the zoom lens 700 of the seventh embodiment of the present invention includes a first lens to a fifteenth lens (the refractive powers thereof are positive, negative, positive, positive, negative, negative, positive, positive, negative, positive, negative, positive, negative, positive and positive, respectively) sequentially arranged along the optical axis 702. The first lens group 710 includes four lenses 712, 714, 716 and 718. The second lens group 720 includes five lenses 722, 724, 726, 728 and 729. The third lens group 730 includes three lenses 732, 734 and 736. The fourth lens group 740 includes two lenses 742 and 744. The fifth lens group 750 includes a lens 752. In addition, the third lens group 730, the fourth lens group 740 and the fifth lens group 750 between the aperture 704 and the imaging plane 750 collectively include three aspheric lenses and two lenses having an Abbe number greater than 45. The lenses 714 and 716 form a doulet lens. The lenses 724 and 766 form a doulet lens. The lenses 734 and 736 form a doulet lens. The lenses 742 and 744 form a doulet lens.

Figure 8:
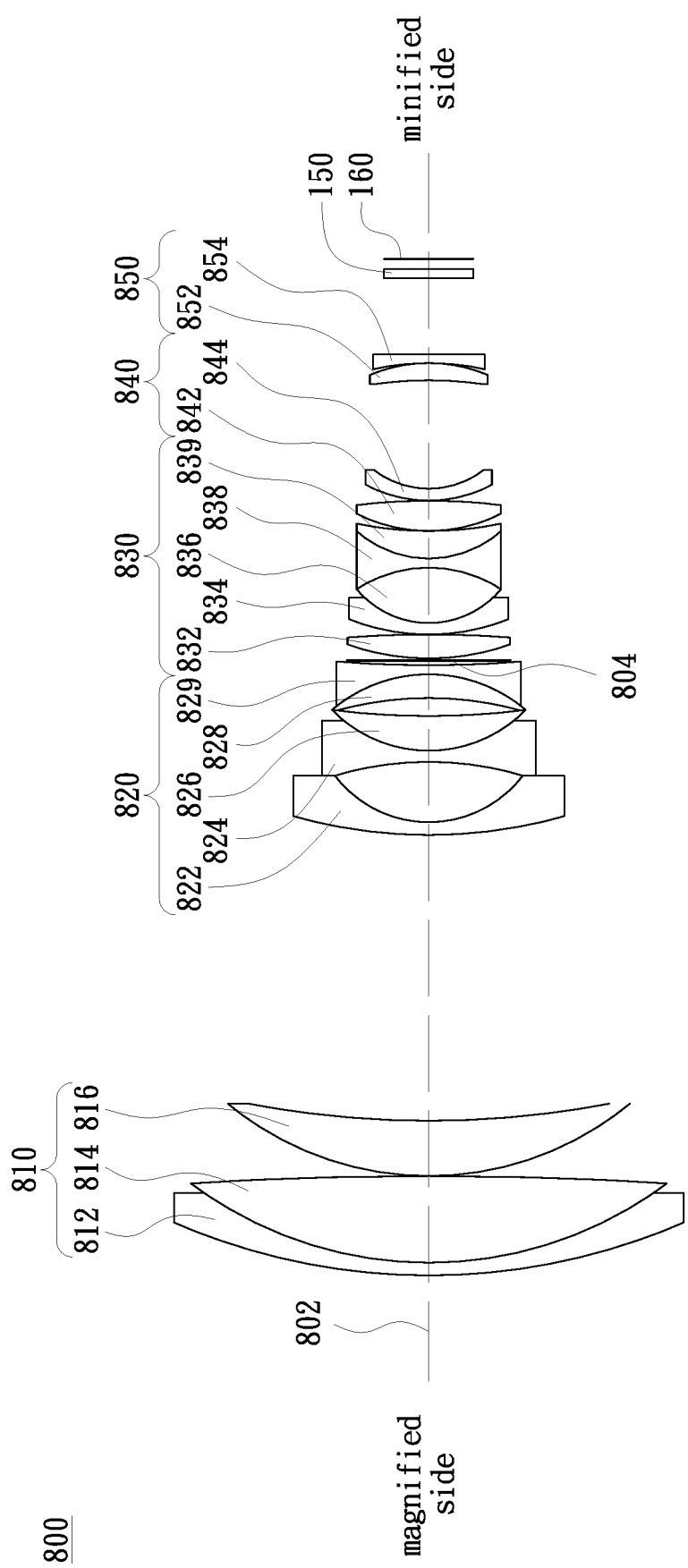

As shown in FIG. 8, the zoom lens 800 of the eighth embodiment of the present invention includes a first lens to a seventeenth lens (the refractive powers thereof are negative, positive, positive, negative, negative, positive, positive, negative, positive, negative, positive, negative, positive, positive, negative, positive and negative, respectively) sequentially arranged along the optical axis 802. The first lens group 810 includes three lenses 812, 814 and 816. The second lens group 820 includes five lenses 822, 824, 826, 828 and 829. The third lens group 830 includes five lenses 832, 834, 836, 838 and 839. The fourth lens group 840 includes two lenses 842 and 844. The fifth lens group 850 includes two lenses 852 and 854. In addition, the third lens group 830, the fourth lens group 840 and the fifth lens group 850 between the aperture 804 and the imaging plane 850 collectively include three aspheric lenses and two positive lenses having an Abbe number greater than 45. The lenses 812 and 814 form a dual lens. The lenses 824 and 826 form a doulet lens. The lenses 828 and 829 form a doulet lens. The lenses 836, 838 and 839 form a triplet lens. The lenses 852 and 854 form a doulet lens.

Figure 9:
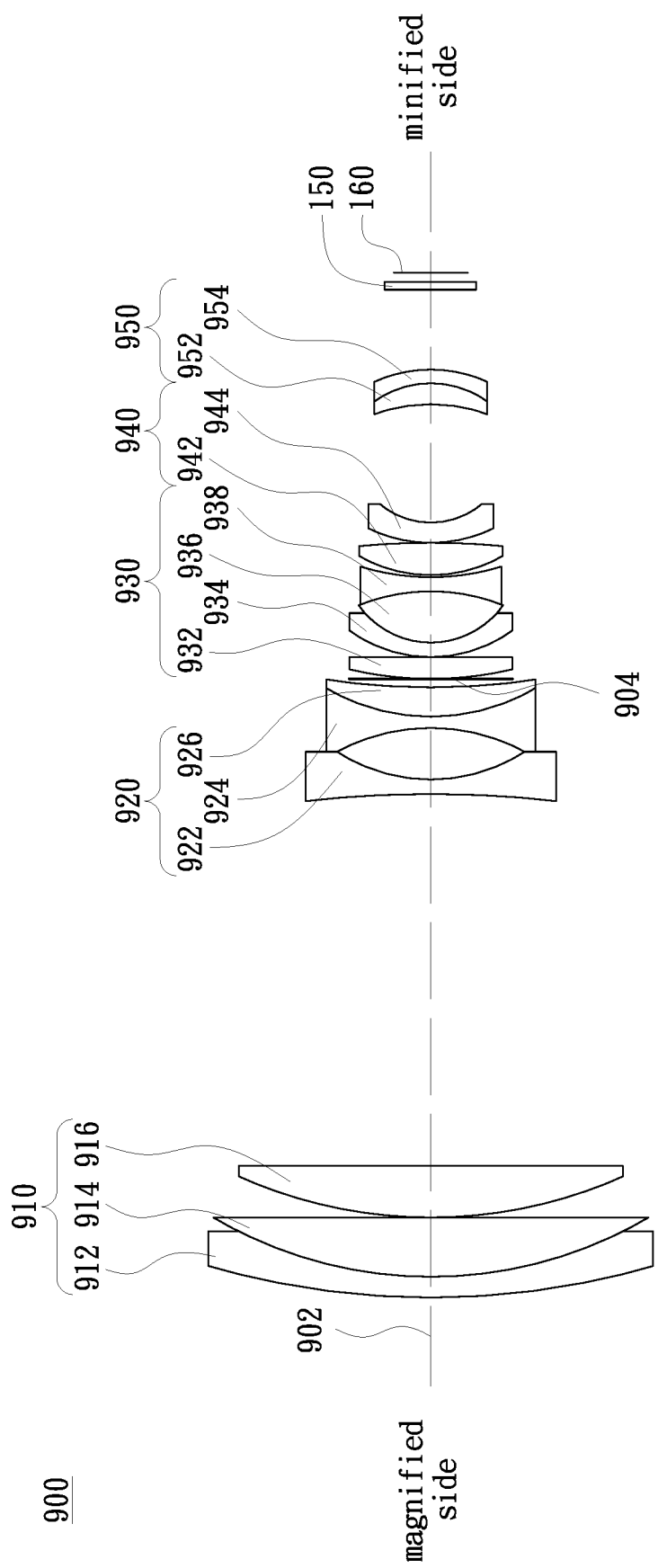

As shown in FIG. 9, the zoom lens 900 of the ninth embodiment of the present invention includes a first lens to a fourteenth lens (the refractive powers thereof are negative, positive, positive, negative, negative, positive, positive, negative, positive, negative, positive, negative, positive and negative, respectively) sequentially arranged along the optical axis 902. The first lens group 910 includes three lenses 912, 914 and 916. The second lens group 920 includes three lenses 922, 924 and 926. The third lens group 930 includes four lenses 932, 934, 936 and 938. The fourth lens group 940 includes two lenses 942 and 944. The fifth lens group 950 includes two lenses 952 and 954. In addition, the third lens group 930, the fourth lens group 940 and the fifth lens group 950 between the aperture 904 and the imaging plane 950 collectively include three aspheric lenses and a positive lens having an Abbe number greater than 45. The lenses 912 and 914 form a doulet lens. The lenses 924 and 926 form a doulet lens. The lenses 934, 936 and 938 form a triplet lens. The lenses 952 and 954 form a doulet lens.

Figure 10:
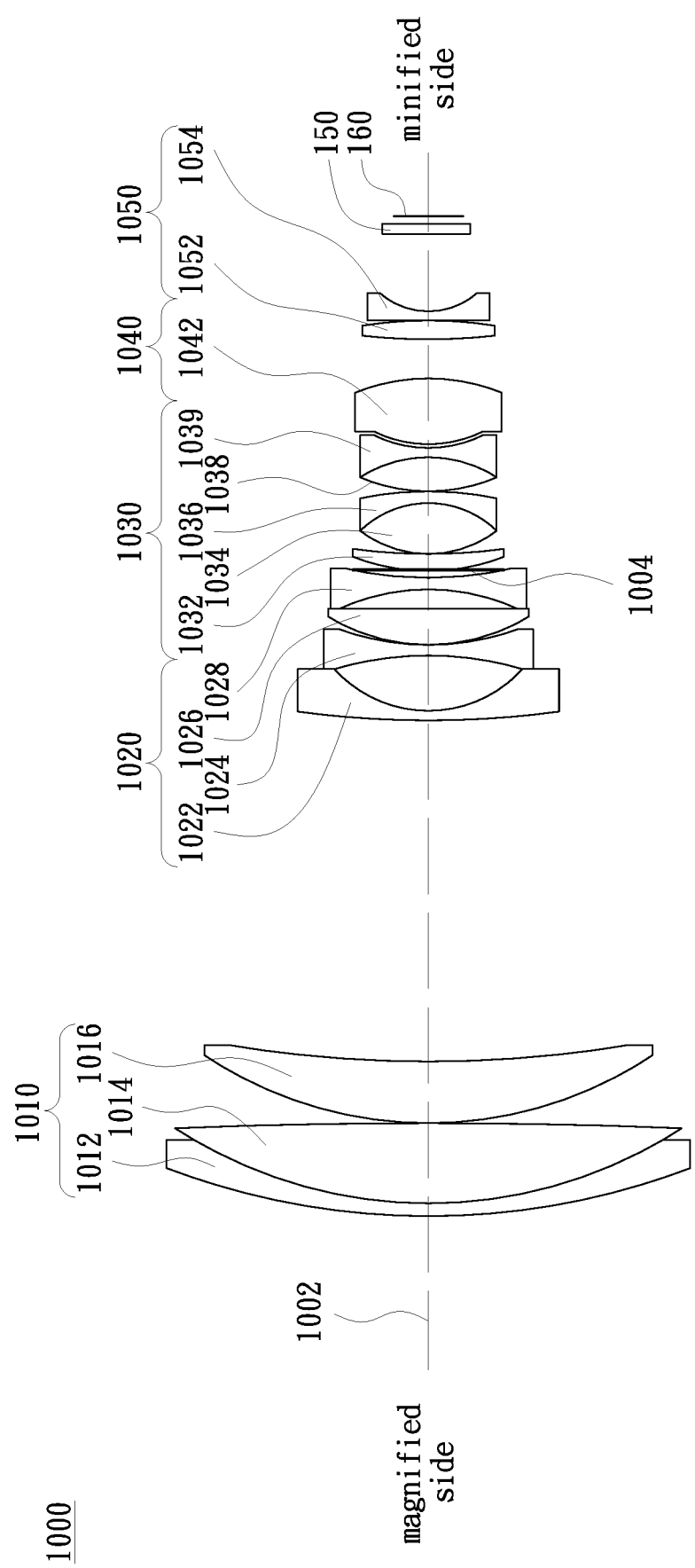

As shown in FIG. 10, the zoom lens 1000 of the tenth embodiment of the present invention includes a first lens to a fifteenth lens (the refractive powers thereof are negative, positive, positive, negative, positive, negative, positive, positive, positive, negative, positive, negative, positive, positive and negative, respectively) sequentially arranged along the optical axis 1002. The first lens group 1010 includes three lenses 1012, 1014 and 1016. The second lens group 1020 includes four lenses 1022, 1024, 1026 and 1028. The third lens group 1030 includes five lenses 1032, 1034, 1036, 1038 and 1039. The fourth lens group 1040 includes a lens 1042. The fifth lens group 1050 includes two lenses 1052 and 1054. In addition, the third lens group 1030, the fourth lens group 1040 and the fifth lens group 1050 between the aperture 1004 and the imaging plane 1050 collectively include three aspheric lenses and two positive lenses having an Abbe number greater than 45. The lenses 1012 and 1014 form a doulet lens. The lenses 1034 and 1036 form a doulet lens. The lenses 1038 and 1039 form a doulet lens.

In the eighth, ninth and tenth embodiments, the aperture located between the second lens group and the third lens group is fixed. When the second lens group moves toward the imaging plane and the fourth lens group moves away from the imaging plane, the zoom lens is switched from the wide-angle end to the telephoto end. Alternatively, when the second lens group moves away from the imaging plane and the fourth lens group moves toward the imaging plane, the zoom lens is switched from the telephoto end to the wide-angle end. The second lens group and the fourth lens group can move in the optical axis direction to perform the zoom operation, and the fourth lens group can move in the optical axis direction to perform the focus operation. In one embodiment, the moving distance of the fourth lens group on the optical axis is less than 5 mm.

Figure 11:
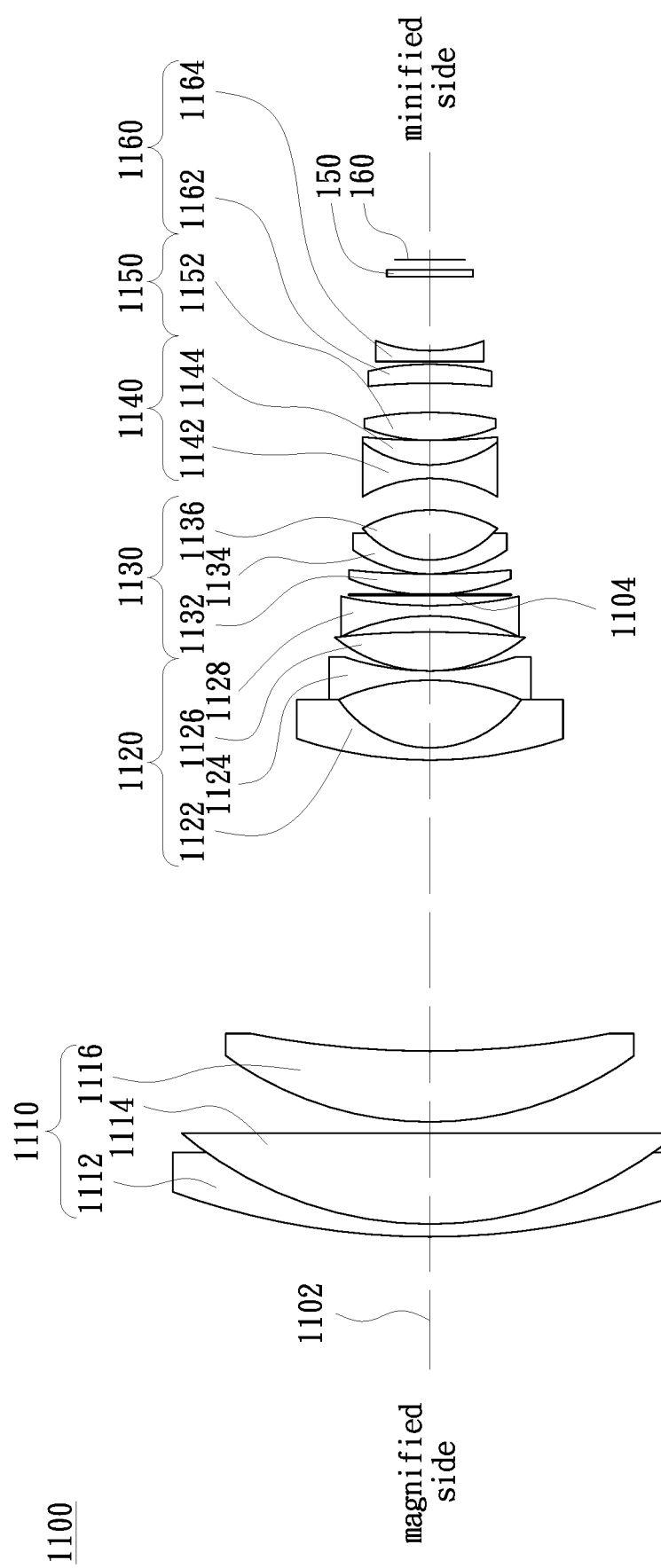

As shown in FIG. 11, the zoom lens 1100 of the eleventh embodiment of the present invention includes a first lens to a fifteenth lens (the refractive powers thereof are negative, positive, positive, negative, positive, positive, negative, positive, negative, positive, negative, positive, positive, positive and negative, respectively) sequentially arranged along the optical axis 1102. The first lens group 1110 includes three lenses 1112, 1114 and 1116. The second lens group 1120 includes four lenses 1122, 1124, 1126 and 1128. The third lens group 1130 includes three lenses 1132, 1134 and 1136. The fourth lens group 1140 includes two lenses 1142 and 1144. The fifth lens group 1150 includes a lens 1152. The sixth lens group 1160 includes lenses 1162 and 1164. In addition, the third lens group 1130, the fourth lens group 1140, the fifth lens group 1150 and the sixth lens group 1160 between the aperture 1104 and the imaging plane 160 collectively include three aspheric lenses and one positive lens having an Abbe number greater than 45. The lenses 1112 and 1114 form a doulet lens. The lenses 1134 and 1136 form a doulet lens. The lenses 1142 and 1144 form a doulet lens.

In the seventh and eleventh embodiments, the aperture between the second lens group and the third lens group is fixed. When the second lens group and the fourth lens group move toward the imaging plane and the fifth lens group moves away from the imaging plane, the zoom lens is switched from the wide-angle end to the telephoto end. Alternatively, when the second lens group and the fourth lens group move away from the imaging plane and the fifth lens group moves toward the imaging plane, the zoom lens is switched from the telephoto end to the wide-angle end. The second lens group, the fourth lens group and the fifth lens group can move in the optical axis direction to perform the zoom operation, and the fourth lens group and the fifth lens group can move in the optical axis direction to perform the focus operation. In one embodiment, the moving distance of the fourth lens group on the optical axis is less than 5 mm.

In the seventh to eleventh embodiments, the zoom lens has at least five lens groups and can achieve the requirement of wide angle and large aperture. By using the third lens group including a positive lens having an Abbe number greater than 45 to correct the chromatic aberration, the displacement of the visible light and infrared on the focal plane can be reduced, so that the zoom lens has a good day-and-night confocal characteristics. By using the fourth lens group including an aspheric lens, the aberration caused by a large aperture can be eliminated. In addition, the moving distance of the fourth lens group on the optical axis is less than 5 mm, so that the zoom lens can have a large aperture at the telephoto end. Therefore, the zoom lens of the seventh to eleventh embodiments can have both of the good optical imaging quality and the 24-hours confocal image-capturing capability.

It should be noted that the parameters and figures listed and shown in Tables 1 to 18 are for illustrative purposes only and not to limit the present invention. While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A zoom lens, comprising:
   a first lens group;
   a second lens group;
   a third lens group;
   a fourth lens group, wherein the first lens group, the second lens group, the third lens group and the fourth lens group are sequentially arranged in a direction; and
   an aperture, disposed between the second lens group and the third lens group, wherein when the zoom lens performs a zoom operation, the first lens group and the third lens group are fixed and the second lens group and the fourth lens group are moveable toward or away from the third lens group along an optical axis of the zoom lens, and a maximum moving distance of the fourth lens group on the optical axis of the zoom lens is less than 5 mm.

2. The zoom lens according to claim 1, wherein the aperture is fixed when the zoom lens performs the zoom operation.

3. The zoom lens according to claim 1, wherein when the zoom lens performs the zoom operation, the second lens group is moveable toward an imaging plane of the zoom lens along the optical axis and the fourth lens group is moveable away from the imaging plane along the optical axis.

4. The zoom lens according to claim 3, wherein the fourth lens group is moveable toward or away from the imaging plane along the optical axis when the zoom lens performs a focus operation.

5. The zoom lens according to claim 1, wherein the fourth lens group comprises two aspheric lenses.

6. The zoom lens according to claim 1, wherein the third lens group comprises two positive lenses having an Abbe number greater than 45.

7. The zoom lens according to claim 1, wherein the fourth lens group comprises an aspheric lens furthest from an imaging plane of the zoom lens.

8. The zoom lens according to claim 1, wherein the first lens group comprises three lenses sequentially arranged along the optical axis and respectively having negative, positive and positive refractive powers, and the second lens group comprises three lenses sequentially arranged along the optical axis and respectively having negative, negative and positive refractive powers.

9. The zoom lens according to claim 1, wherein the third lens group comprises four lenses farthest away from the aperture, sequentially arranged along the optical axis and respectively having positive, positive, negative and positive refractive powers, and the fourth lens group comprises three lenses sequentially arranged along the optical axis and respectively having positive, negative and positive refractive powers.

10. The zoom lens according to claim 1, wherein the zoom lens further comprises a fifth lens group, wherein the first lens group, the second lens group, the third lens group, the fourth lens group and the fifth lens group are sequentially arranged from a magnified side to a minified side, and when the zoom lens performs a zoom operation, the aperture is fixed and the fifth lens group is moveable.

11. The zoom lens according to claim 10, wherein when the zoom lens performs the zoom operation, the second lens group and the fourth lens group are moveable toward an imaging plane of the zoom lens along the optical axis and the fifth lens group is moveable, away from the imaging plane along the optical axis.

12. The zoom lens according to claim 11, wherein the fourth lens group and the fifth lens group are moveable toward or away from the imaging plane along the optical axis when the zoom lens performs a focus operation.

13. The zoom lens according to claim 10, wherein there are three aspheric lenses between the aperture and an imaging plane of the zoom lens.

14. The zoom lens according to claim 10, wherein there are two positive lenses having an Abbe number greater than 45 between the aperture and an imaging plane of the zoom lens.

15. The zoom lens according to claim 10, wherein there is a positive lens having an Abbe number greater than 45 between the aperture and an imaging plane of the zoom lens, and the zoom lens further comprises a sixth lens group located between the fifth lens group and the imaging plane.

16. The zoom lens according to claim 10, wherein there are three aspheric lenses between the aperture and an imaging plane of the zoom lens, the first lens group comprises three lenses sequentially arranged along the optical axis and respectively having negative, positive and positive refractive powers, and there are six lenses sequentially arranged along the optical axis between the aperture and the imaging plane and respectively having positive, negative, positive, negative, positive and positive refractive powers.

17. The zoom lens according to claim 1, wherein the zoom lens further comprises a fifth lens group, wherein the first lens group, the second lens group, the third lens group, the fourth lens group and the fifth lens group are sequentially arranged from a magnified side to a minified side, and when the zoom lens performs a zoom operation, the aperture and the fifth lens group are fixed, wherein there are three aspheric lenses between the aperture and an imaging plane of the zoom lens.

18. The zoom lens according to claim 17, wherein when the zoom lens performs the zoom operation, the second lens group is moveable toward the imaging plane along the optical axis and the fourth lens group is moveable, away from the imaging plane along the optical axis, wherein when the zoom lens performs a focus operation, the fourth lens group is moveable toward or away from the imaging plane along the optical axis.

19. The zoom lens according to claim 17, wherein the first lens group comprises three lenses sequentially arranged along the optical axis and respectively having negative, positive and positive refractive powers, respectively, and the fifth lens group comprises two lenses sequentially arranged along the optical axis and respectively having positive and negative refractive powers.

20. The zoom lens according to claim 17, wherein there is a positive lens having an Abbe number greater than 45 between the aperture and the imaging plane, there are five lenses sequentially arranged along the optical axis and respectively having positive, negative, positive, negative and positive refractive powers between the aperture and the imaging plane, and the fifth lens group comprises two lenses sequentially arranged along the optical axis and respectively having positive and negative refractive powers.

* * * * *